G. ORAVETZ.
HANDLE ATTACHING MEANS.
APPLICATION FILED AUG. 30, 1912.
1,141,001.
Patented May 25, 1915.
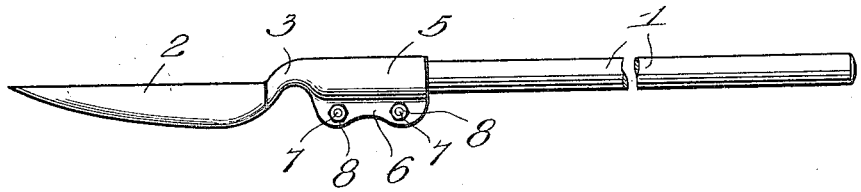
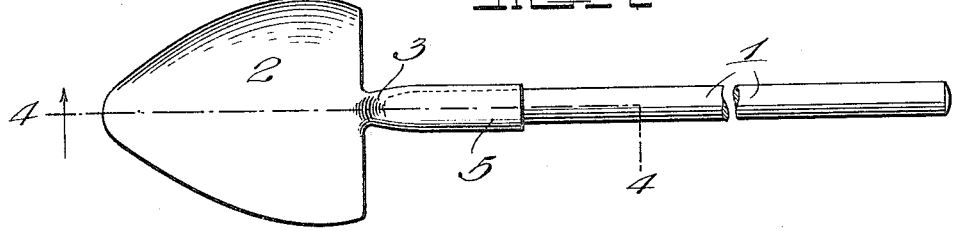
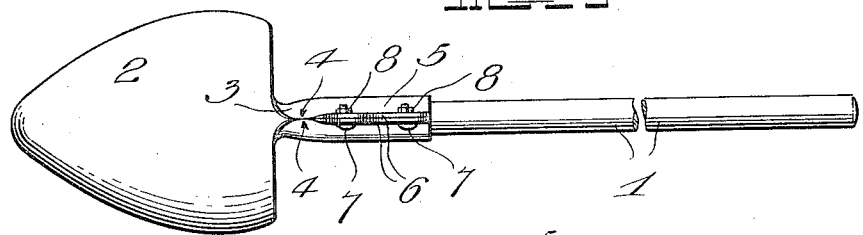
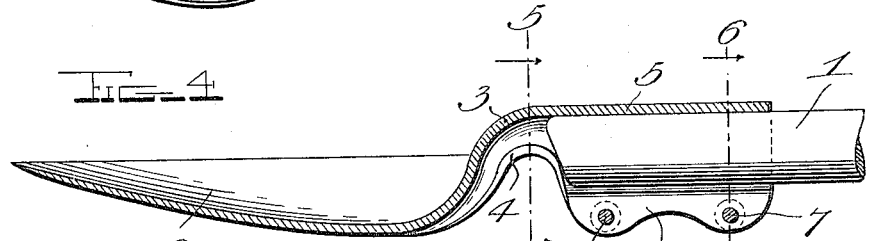
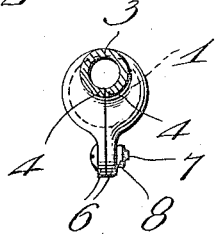
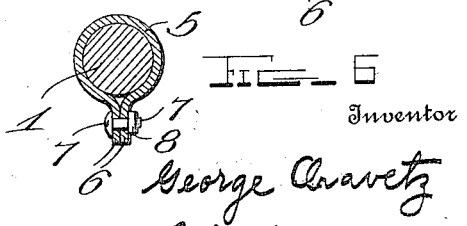

UNITED STATES PATENT OFFICE.

GEORGE ORAVETZ, OF PACIFIC CITY, WASHINGTON.

HANDLE-ATTACHING MEANS.

1,141,001. Specification of Letters Patent. Patented May 25, 1915.

Application filed August 30, 1912. Serial No. 717,920.

*To all whom it may concern:*

Be it known that I, GEORGE ORAVETZ, citizen of the United States, residing at Pacific City, in the county of King and State of Washington, have invented new and useful Improvements in Handle-Attaching Means, of which the following is a specification.

My present invention pertains to means for effecting connection of shovels and other implements to the handles thereof; and it consists in the peculiar and advantageous construction hereinafter described and definitely claimed.

In the drawings, accompanying and forming part of this specification: Figure 1 is a side elevation of a shovel blade equipped in accordance with my invention, and fixed with respect to a handle. Fig. 2 is a top plan view. Fig. 3 is a bottom plan view. Fig. 4 is a vertical, longitudinal section, on line 4—4 of Fig. 2. Figs. 5 and 6 are cross-sectional views, taken on line 5—5 and 6—6 of Fig. 4.

Similar numerals of reference designate corresponding parts in all of the views of the drawings.

The present embodiment of my invention is for the purpose of connecting a shovel blade to a handle 1 that is made of wood. I desire it distinctly understood, however, that my improvement may be employed for effecting connection between an implement of any description and a wood handle, so as to securely and strongly fasten the implement to the wood handle.

The shovel blade 2 is made of sheet-steel and is slightly dished, by preference, in the conventional manner, and is of the usual configuration, though it may be made perfectly flat or curved and of any configuration. At the middle of its rear edge, the blade 2 merges into an integral shank 3. The said shank 3 is formed by bringing the edges 4 of a reduced portion of the sheet-metal together, as clearly shown in Figs. 3 and 5. It will also be observed by comparison of the figures of the drawings that the shank 3 is curved slightly upward and rearward from the rear edge of the blade 2, and is of circular form in cross-section. By virtue of the shank being curved upward and rearward from the blade, and being of circular form in cross-section, it will be manifest that the shank is possessed of great rigidity and strength, and is not likely to interfere in an appreciable degree with the driving of the blade a considerable distance below the surface of the soil. The shank 3 merges at its rear end into a portion 5 of greater width than the shank portion; the said portion 5 being integral with the shank portion, or in other words, the blade 2, the shank portion 3 and the comparatively wide portion 5 are formed of a single piece of sheet-steel or other material compatible with the purpose of my invention. The shank portion 5 is bent into approximate circular form in cross-section to receive the wood handle 1, and its edge portions are arranged side by side to form opposed flanges 6, as best shown in Figs. 1, 3 and 6. Obviously there may be one or more than one pair of the flanges 6, though I prefer to employ two; each pair of flanges is apertured to receive a transverse bolt 7, and on the bolt is a nut 8, the function of which is to clamp the portion 5 on the wood handle 1, and thereby securely and strongly fasten the handle 1 in the socket formed by the portion 5. By virtue of the portion 5 being integral with the shank 3 and the blade 2, and the whole being formed of a single piece of sheet steel, it will be manifest that the portion 5 may be readily clamped against and accommodated to a handle so as to strongly join the implement to the handle and reinforce the handle; also, that because of the portion 5 being resilient it is adapted to receive and be securely fixed on handles of different diameters.

It will be gathered from the foregoing that my novel implement is inexpensive and easy to manufacture, and yet is strong and well adapted to withstand the rough usage to which shovels and other implements are ordinarily subjected. It will also be gathered that the socket formed by the portion 5 reinforces the forward portion of the wood handle and renders the same so strong that there is little liability of the said handle portion being broken, and at the same time the socket formed by the said portion 5 is so securely clamped on the wood handle that there is little or no liability of the implement being casually displaced from the handle. This will be better appreciated when it is borne in mind that when the handle is utilized to assist in the driving of the implement blade into the ground, the handle will be pressed toward the forward closed end of the socket formed by the portion 5. In the event of the wood handle being fractured it is manifest that the broken fragment may be expeditiously and easily removed from the socket portion 5 and a new handle as readily disposed and fastened in the said socket portion; and it will also be manifest that in the event of the break occurring near the socket portion 5, the forward portion of the major section of the handle can be tapered, if necessary, and fastened in the socket portion and used temporarily until a handle of the original length can be procured. Again, if the wood handle be broken while the implement is being employed in woods or adjacent to woods, a bough can be cut and trimmed and used in the socket portion 5 as a temporary handle until a regular wood handle can be obtained.

In shipping, the handles and implements may be packed separately thereby taking up less space and permitting of convenient handling.

Having described my invention, what I claim and desire to secure by Letters-Patent, is:

As a new article of manufacture, an implement formed of sheet-metal possessed of resiliency and having an integral sheet-metal shank and an integral sheet-metal resilient socket portion; the shank being formed of a portion of sheet-metal of reduced width and curved in the direction of its length to present a lengthwise convex forward side and being of circular form in cross-section with the edges of the reduced portion of the sheet-metal opposed to and abutting against each other at the under side and the rear side of the shank, and the socket portion being formed of a comparatively wide portion of sheet-metal and being of circular form in cross-section and provided with a reduced forward end and also provided at its edges with opposed integral depending flanges having apertures, whereby said socket portion may be clamped on and accommodated to handles of different diameters; said flanges being disposed immediately at opposite sides of the longitudinal center of the socket portion, and means for connecting said flanges and clamping the socket portion against a handle.

In testimony whereof I have hereunto set my hand in presence of two subscribing witnesses.

GEORGE ORAVETZ.

Witnesses:
R. W. JAMIESON,
JOHN G. BUCSKO.

Copies of this patent may be obtained for five cents each, by addressing the "Commissioner of Patents, Washington, D. C."